(No Model.)
G. F. VIRTUE.
INSULATING COVERING FOR PINCHER HANDLES.
No. 442,155. Patented Dec. 9, 1890.
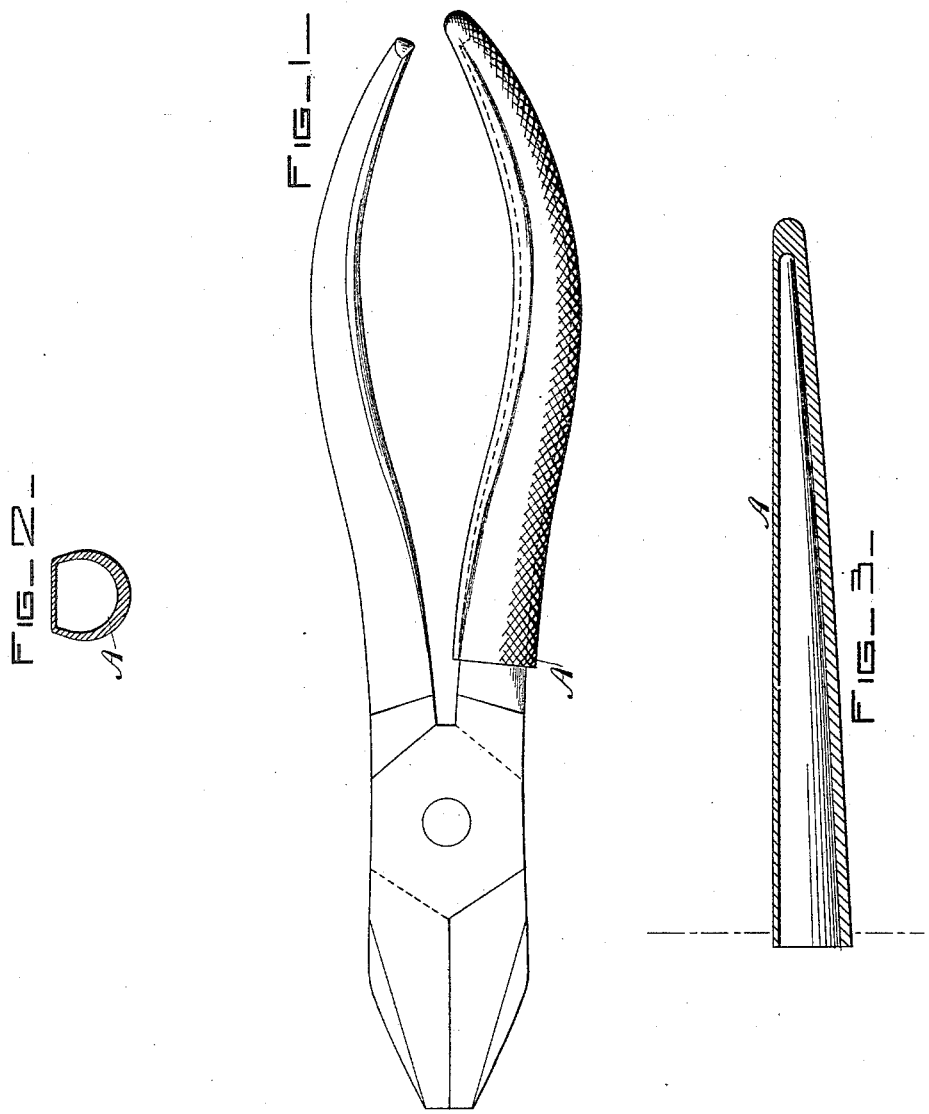
WITNESSES:
E. L. Rawson.
N. F. Hayes
INVENTOR:
George F. Virtue
by Burleigh & Bright
ATTYS.

UNITED STATES PATENT OFFICE.

GEORGE F. VIRTUE, OF BOSTON, MASSACHUSETTS.

INSULATING-COVERING FOR PINCHER-HANDLES.

SPECIFICATION forming part of Letters Patent No. 412,155, dated December 9, 1890.

Application filed July 31, 1890. Serial No. 360,514. (No model.)

*To all whom it may concern:*

Be it known that I, GEORGE F. VIRTUE, a citizen of the United States, residing at Boston, county of Suffolk, State of Massachusetts, have invented certain new and useful Improvements in Insulating-Coverings for the Handles of Pinchers and Similar Metallic Tools, of which the following is a specification.

My invention consists in an insulating-covering to be applied to the handles of pinchers which are to be used by linemen and electricians generally.

It also consists in a tapering tube formed of insulating material, preferably rubber, which is adapted to be slipped over the handle of a pair of pinchers, and has the features of construction shown in the accompanying drawings.

Referring to the said drawings, Figure 1 is a view of a pair of pinchers covered with one of my devices. Figs. 2 and 3 are respectively transverse and longitudinal sections of a tube made according to my invention.

A general outline of the tube or handle covering is shown in Fig. 3, and it will be seen that it consists of a tapering hollow piece of rubber A, having one side flat and thin and the remaining part round in outline and of thicker material. A solid filling is made at the tip. It is formed in this shape in order that when placed in position, as shown in Fig. 1, the outside of the handle, where the insulation is required and where the wear is greatest, is provided with a thick covering of rubber, while the inside of the handle has only a thin covering, which not only effects a saving in rubber, but permits the device to adjust itself readily to different sizes of tools. The filling in the tip also insures that there is never any leakage at that point, and that the wear which is greatest at that place will never cut through the rubber.

I am aware that it is not new to wrap the handles of pinchers or similar tools with tape in order to insulate them; but this is a matter of trouble and time, and is unsatisfactory in practice, as the insulation is never reliable, and shocks are of frequent occurrence. Pinchers have also been made with handles of insulating material but this does not give enough strength to the tool, and, besides being costly, there is always a weak spot at the joint between the handle and the jaws.

I am also aware that it has been proposed to construct pinchers having a rubber covering upon detachable vitreous-covered handles; but I believe that I am the first to produce an article such as described which is readily applied to pinchers of ordinary form, being previously shaped to conform generally to the handle usually employed, so that it is held in place by a slight uniform tension produced by a part of the covering itself not subject to wear.

My device is simple and cheap, and can readily be applied to tools of any size without impairing their strength, while the insulation is reliable and durable.

What I claim as new, and desire to secure by Letters Patent, is—

As a new article of manufacture, an insulating-cover to be applied generally to pincher-handles, consisting of a rubber tube shaped with a taper to adapt it to the ordinary form of handle, and provided with one thin side, by which it is adjusted and by which the wear comes upon the part having the least tension.

GEORGE F. VIRTUE.

Witnesses:
W. H. KNIGHT,
E. M. BENTLEY.